United States Patent Office.

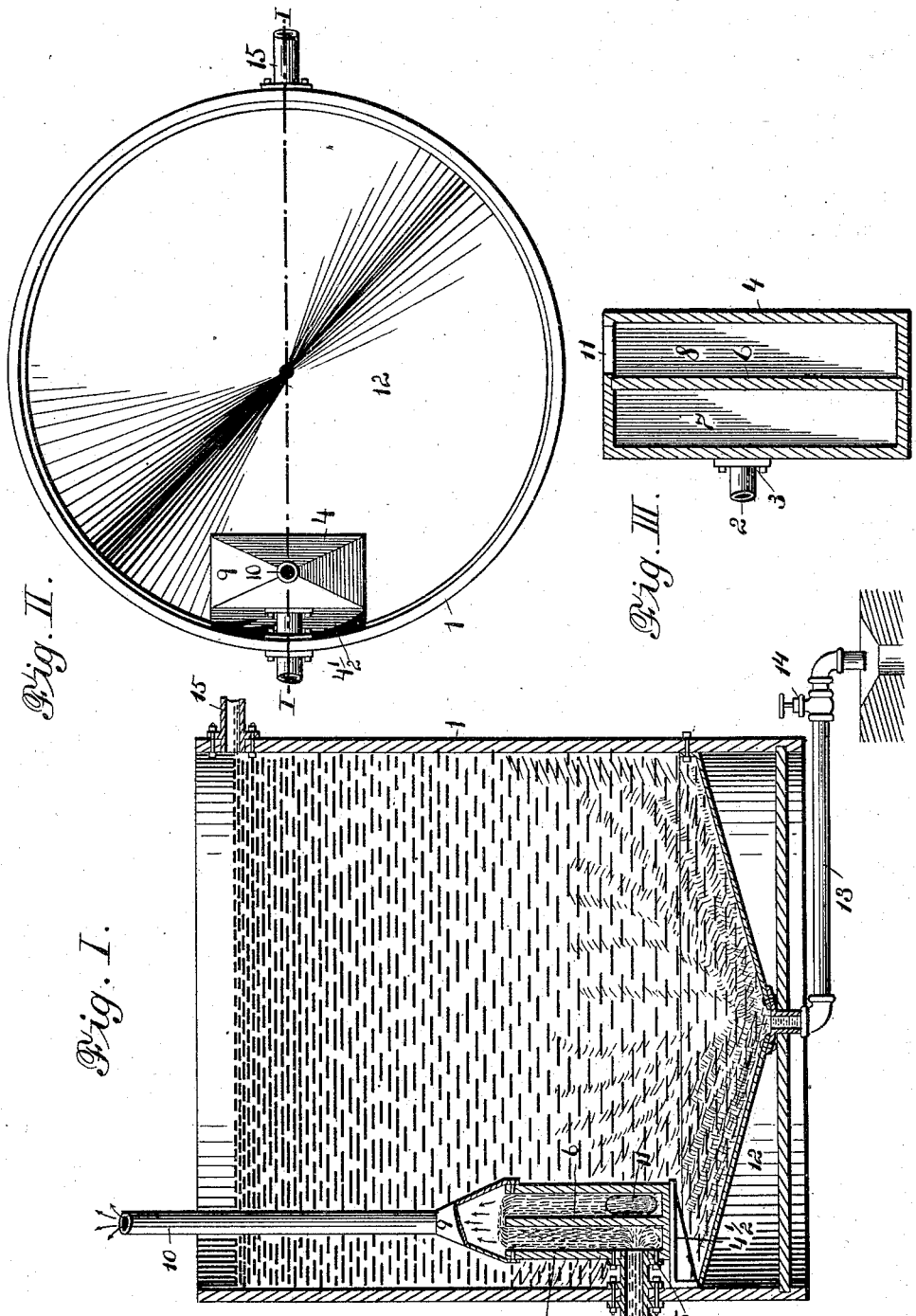

ARTHUR PENNELL, OF KANSAS CITY, MISSOURI.

WATER-PURIFIER.

SPECIFICATION forming part of Letters Patent No. 474,685, dated May 10, 1892.

Application filed July 11, 1891. Serial No. 399,169. (No model.)

*To all whom it may concern:*

Be it known that I, ARTHUR PENNELL, of Kansas City, in the county of Jackson and State of Missouri, have invented certain new and useful Improvements in Water-Purifiers, of which the following is a full, clear, and exact description, reference being had to the accompanying drawings, which form a part of this specification.

My invention relates to certain new and useful improvements in water-purifiers for eliminating scale-forming salts from Artesian-well and other hard waters, rendering them fit for boiler use and other technical purposes; and it consists in features of novelty hereinafter pointed out in the claims.

Figure I represents a vertical section, taken on line I I, Fig. II, of my improved purifier. Fig. II is a top view of the purifier. Fig. III is an enlarged transverse view of the baffle-box.

Referring to the drawings, 1 represents a circular tank, of which there may be one or more, said tanks being of such dimensions that they may contain from one to three hours' supply of water for the purpose required, the areas of the tanks being governed by the amount of free or loosely-combined carbonic acid present in the water.

2 represents a supply-pipe leading into the baffle-box, said pipe being located about one-fourth of the height of the water from its bottom, through a flange-nipple 3, said baffle-box 4 having its base resting on a bracket 4½, located in the tank, and being firmly bolted to said flange-nipple, as shown at 5. Said baffle-box 4 is made oblong in cross-section, (see Fig. III,) with a central partition 6 extending the long way of the box, thus forming vertical chambers 7 8 on each side of said partition. The top of the baffle-box 4 extends up about one-half the height of the tank 1 and is provided with a galvanized-iron or otherwise constructed funnel 9, said funnel terminating in a flue 10, through which imprisoned gases or air are permitted to escape. The water after passing in through the supply-pipe 2 passes up through the chamber 7, over the top of the partition 6, and down through the chamber 8, and then passes from the baffle-box out through an opening 11 into the tank 1. Said opening 11 is located at the side of the baffle-box, so that the outflowing currents may pass out into the tank 1 at right angles to the radius of the tank at that point, thereby inducing a gyratory or whirling movement in the tank.

In order to eliminate the salts in the water, I introduce into the supply-pipe 2 the necessary chemicals, consisting, mostly, of slaked lime, the composition and quantity of which must be determined by analysis of the water. Said chemicals pass with the water into the baffle-box 4, where they are thoroughly mixed with the water, and on emerging through the opening 11 the precipitate coagulates. Owing to the gyratory or whirling movement of the water in the tank 1 the precipitate tends to the center of the same, where it subsides, as exemplified by nature in a whirlpool. This performance is assisted by locating near the bottom of the tank a funnel 12, having its lowest portion at the center of the tank, where it is connected with a waste-pipe 13, through which the sediment may be flushed, said waste-pipe 13 being controlled by a valve 14.

15 represents the outlet through which the water flows off from the tank 1 perfectly clear, bright, and free from scale-forming salts. Should there be much light organic impurity in the water, the subsidence of the water is delayed and it will be necessary to use some efficient form of filter.

Owing to the construction of my improved purifier I am enabled to clean the same through the waste-pipe at any time without shutting off the supply, thus doing the work with one purifier instead of two or more, as would be necessary in case the supply had to be shut off before the tank could be cleaned.

I claim as my invention—

1. In a water-purifier, the combination of a suitable tank, a supply-pipe, and a baffle-box connected with said supply-pipe for thoroughly mixing chemicals with the water, said baffle-box consisting of chambers 7 8, having an intervening partition 6, an inlet, and an outlet, substantially as set forth.

2. In a water-purifier, the combination of a suitable tank, a supply-pipe, a baffle-box 4, having chambers 7 8, an intervening partition 6, and an opening 11, so situated that the water is discharged from the baffle-box at right angles with the radius of the tank, substantially as and for the purpose set forth.

3. In a water-purifier, the combination of a suitable tank, a supply-pipe, a baffle-box 4 being suitably connected with said supply-pipe, a bracket for supporting the same, said baffle-box having chambers 7 8, with an intervening partition 6 and open at its top, a discharge-opening in said baffle-box, and a flue in connection with said baffle-box for conveying gases or air from the same, substantially as described, and for the purpose set forth.

4. In a water-purifier, the combination of a suitable tank, a supply-pipe, a discharge-pipe, a baffle-box connected with the supply-pipe, said baffle-box having chambers 7 8, with an intervening partition 6, a discharge-opening 11, a flue connected therewith, a funnel located near the bottom of said tank, and a discharge-pipe connected with said funnel, substantially as and for the purpose set forth.

5. In a water-purifier, the combination of a suitable tank, a supply-pipe entering said tank, and a distributing-chamber on the inside of said tank and connected with said supply-pipe and having an outlet into the tank extending at right angles to the radius of the tank, said outlet being a suitable distance above the bottom of the tank to obviate disturbing the sediment at the bottom, substantially as and for the purpose set forth.

ARTHUR PENNELL.

Witnesses:
JAS. E. KNIGHT,
F. C. MULLETT.